United States Patent [19]

Moore

[11] Patent Number: 4,680,674
[45] Date of Patent: Jul. 14, 1987

[54] MODULAR COMPUTER SYSTEM WITH INTEGRAL ELECTRONIC BUS

[76] Inventor: Fergus E. Moore, 4801 Hidden Oaks La., Arlington, Tex. 76017

[21] Appl. No.: 631,251

[22] Filed: Jul. 16, 1984

[51] Int. Cl.$^4$ .............................................. H05K 1/12
[52] U.S. Cl. .................................... 361/395; 340/700; 364/708; 361/396; 361/413
[58] Field of Search ................ 364/900, 708; 340/700; 307/149, 150; 339/198 G, 198 H, 75 M, 176 MP, 17 LM, 17 M, 17 N; 200/5 R, 5 A, 307; 211/41; 400/691, 682; 361/390, 391, 393–396, 399, 413, 415

[56] References Cited

U.S. PATENT DOCUMENTS

| | | |
|---|---|---|
| 3,054,024 | 9/1962 | Van Dillen et al. . |
| 3,940,758 | 2/1976 | Margolin . |
| 4,184,733 | 1/1980 | Schmeling ...................... 339/198 H |
| 4,208,081 | 6/1980 | Kekas .............................. 400/682 |
| 4,269,470 | 5/1981 | Ustin .............................. 339/198 H |
| 4,313,112 | 1/1982 | Foster .................................. 340/700 |
| 4,344,663 | 8/1982 | Ognier et al. . |
| 4,388,671 | 6/1983 | Hall et al. . |
| 4,401,351 | 8/1983 | Record . |
| 4,423,465 | 12/1983 | Teng-Ching ......................... 361/394 |
| 4,425,018 | 1/1984 | Stenz .............................. 339/198 H |
| 4,530,066 | 7/1985 | Ohwaki ............................... 364/708 |

FOREIGN PATENT DOCUMENTS 2607868 9/1976 Fed. Rep. of Germany .
2601892 7/1977 Fed. Rep. of Germany .

OTHER PUBLICATIONS

IBM Technical Disclosure Bulletin, vol. 24, No. 1A, Jun. 1981, p. 28.
Mini–Micro Systems, "P–C Compatible Boards and Boxes Form Low-Cost Modular Systems", Jun. 1984, pp. 31–32.
InfoWorld "Modular Expand B25", Jun. 1984, p. 11.
Brochure of Aerosystems, 66 Cherry Hill Dr., P.O. Box 487, Beverly, MA 01915, entitled "Aerosystem-800."
BYTE Publications, Inc., entitled "The Gavilan-A Full-Function Portable Computer."

Primary Examiner—G. P. Tolin
Attorney, Agent, or Firm—Harold E. Meier

[57] ABSTRACT

A modular computer system having an integral electronic bus includes a number of computer components each housed in a casing. Each casing includes a standardized male connector extending from the front surface of the casing and a female receptacle, which is compatible with the male electrical connector, extending into the casing from its rear surface. Each connector and receptacle includes an array of electrical contacts disposed in a predetermined arrangement, such that each connector contact is aligned with a corresponding contact of the casing receptacle. Corresponding pairs of connector and receptacle contacts mate to form the integral electronic bus. Any combination or arrangements of computer components may be electrically interconnected by engaging the receptacle of each casing with the connector of an adjacent casing, thereby forming the integral electrical bus between the interconnected modules.

16 Claims, 16 Drawing Figures

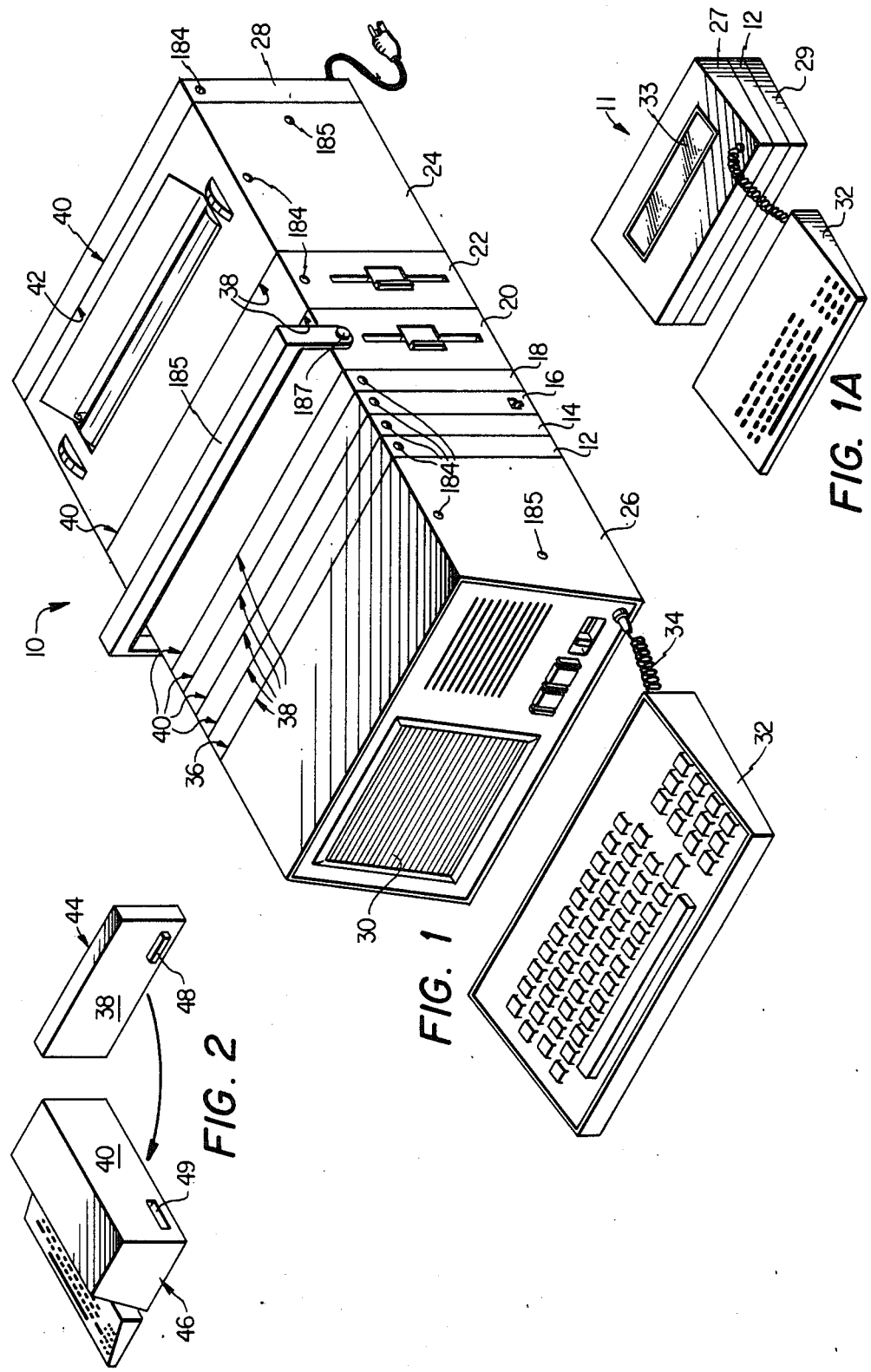

MODULAR COMPUTER SYSTEM WITH INTEGRAL ELECTRONIC BUS

TECHNICAL FIELD

The present invention relates to a modular computer system and, more particularly, to a computer comprising a number of components in modular form which may be connected in various combinations, depending upon user preference.

BACKGROUND OF THE INVENTION

Recent developments in computer technology have made available relatively compact and inexpensive computers known as the "personal computer". Perhaps the greatest demand for personal computers is by individuals and small businesses which are unable to afford or fully utilize a larger computer, such as the main frame variety. Since the application for which the individual or small business intends to use a personal computer varies greatly, it is desireable that the computer be capable of utilizing a number of peripheral components which will adapt a computer for the specific needs of its user. For example, such additional components may include one or more disk drives, additional RAM or ROM capacity, a printer, a telephone modem, a mass storage subsystem, etc. In addition, since most individuals and small businesses require but one personal computer to satisfy their particular needs, it is desireable that such computers be portable to facilitate transport to locations where it may be most effectively utilized.

In an attempt to maximize both the versatility and portability of personal computers, a number of alternatives have been devised. For example, many personal computer components are manufactured as modules which may be electrically interconnected. The component modules of many such computer systems vary greatly in size and shape and are electrically interconnected by means of wire cables or by means of a "mother board" to which each module is affixed.

However, a number of disadvantages are associated with the foregoing modular computer systems. Specifically, the use of a "mother board" to interconnect the modules may either require additional, unnecessary work space for routine applications or limit the number of modules which may be utilized at one time, thereby limiting the capacity of the system. In addition, the cables required to electrically interconnect modules comprising the computer system unnecessarily clutters the work area, complicating the assembly, disassembly, and rearrangement of the computer system and consuming additional work space. Further, the transport of such computer modules is hampered by the need of a carrying case which, in many cases, may be larger than is required to transport the computer modules needed for the routine applications, but may be smaller than is necessary to transport the number of components needed for a complex and demanding application.

BRIEF SUMMARY OF THE INVENTION

These and other disadvantages associated with the prior art are overcome by the present invention. The present invention comprises a modular computer system having computer components which are each housed in a casing. The casing of each computer component includes a standardized male connecter extending from the front (or rear) surface of the casing and a female receptacle which is compatible with the male electrical connector extending into the casing from its rear (or front) surface.

The male connector and female receptacle of each casing are positioned directly opposite each other on the front and rear surfaces of the casing. Each connector and receptacle includes an array of electrical contacts disposed in a predetermined arrangement, such that each connector contact is aligned with a corresponding contact of the casing receptacle. Corresponding pairs of connector and receptacle contacts are electrically interconnected to form a bus for a particular electronic signal. The casings of a number of computer components may be mechanically interconnected, with the receptacle of each casing engaging the connector of an adjacent casing, thereby forming an integral electrical bus between the mechanically interconnected modules. Standardization of the location and configuration of the connectors and receptables of each module allows any combination of computer components to be included in the system and further allows the interconnection of such components in virtually any order.

The present invention also includes an input/output module, such as a visual display and keyboard, having a receptacle extending inwardly from the rear surface thereof. The receptacle of the input/output module is substantially identical to the receptacle of each computer component module. Therefore, the input/output module receptacle is capable of engagement with the connector of each component module, thereby allowing electrical connection of the input/output module to any other module of the computer system.

Further, the present invention includes a power supply module for supplying electrical power to the system. The power supply module includes a male connector extending outwardly from the front surface of the module. The power supply connector is substantially identical to the connector of each computer component module. Disposed on the power supply connector is at least one contact electrically connected to a power supply within the power supply module for transmitting power to at least one connector contact of the component modules comprising the system.

In accordance with other features of the present invention, the power supply module includes safety means, for disrupting the supply of power to the computer components comprising the system, responsive to the separation of adjacent component module. Securing means are also provided for mechanically interconnecting adjacent computer modules. In addition, each casing is provided with one or more fixtures or apertures for engagement with a lifting handle. Thus, when the desired combination of computer components are secured together by mechanically interconnecting adjacent modules, a lifting handle may be affixed to the lifting fixture or aperture of any module desired, allowing the entire computer system to be lifted and transported thereby.

Numerous advantages are associated with the present invention. One advantage deriving from the use of the present invention is the ability to interconnect the computer component modules easily, without the need of cumbersome cables or additional accessories. Another advantage deriving from the use of the present invention is the ability to interconnect any combination of computer components in virtually any order, thereby facilitating the addition of computer components to the system and maximizing the versatility of the computer system. Yet another advantage deriving from the use of the present invention is the formation of an integral electronic bus by the interconnection of adjacent computer modules, thereby further facilitating assembly of the computer system. Still another advantage deriving from the use the present invention is the enclosure of individual computer components by a casing, thereby obviating the need of an enclosure to protect the entire assembled computer system. Still another advantage deriving from the use of the present invention is the ability to mechanically interconnect adjacent computer modules, thereby allowing transport of the computer system while it is assembled and further allowing transport of only those modules required for the intended application. Still another advantage deriving from the use of the present invention is the ability to electrically interconnect modules comprising a system without the use of cables, thereby eliminating electromagnetic interference with surrounding electronic devices often caused by cables and, further, eliminating the need of shielded cables to reduce or eliminate such interference. Still another advantage deriving from the use of the present invention is the ability to minimize the work area required for the modular computer system by providing computer component modules which may be assembled with front and rear surfaces abutting to form an integral electronic bus therebetween. Other advantages deriving from the use of the present invention will become apparent from the practice of the present invention.

BRIEF DESCRIPTION OF THE DRAWINGS

A more complete understanding of the invention may be had by reference to the following Detailed Description when taken in conjunction with the accompanying drawings, wherein:

FIG. 1 is a perspective view of an assembled modular computer system incorporating the present invention;

FIG. 1A is a perspective view of an assembled modular computer system incorporating the present invention, illustrating a minimum combination of modules;

FIG. 2 is a perspective view of the front and rear surfaces of computer modules incorporating the present invention;

DETAILED DESCRIPTION

Figure 3:
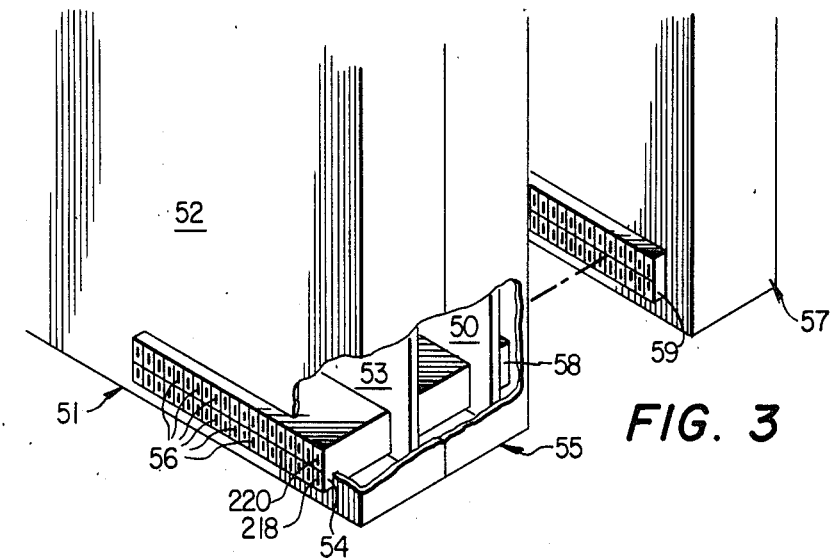
FIG. 3 is a perspective view illustrating the interior of two interconnected computer modules incorporating the present invention and a third unconnected module.

An assembled modular computer system 10 incorporating the present invention is illustrated in FIG. 1. The computer system 10 includes a number of computer component modules 12 through 24 interposed between an input/output module 26 at the front end of the system 10 and a power supply module 28 at the back end of the system. The input/output module 26 includes a visual display screen 30, such as a CRT or LCD display, for communicating data to the user. Data is input to the input/output module 26 by means of a keyboard 32 electrically connected to the input/output module via line 34. Electrical power is provided to the system 10 by the power supply module 28.

Component modules 12 through 24 contain a number of standard components, or peripherals, often required in the use of a personal computer. For example, module 12 of system 10 contains one or more printed circuit boards on which are mounted integrated circuit chips comprising the central processing unit and memory of the computer system 10. Similarly, the remaining modules include a peripheral RAM memory 14, a telephone modem 16, a master disk drive 20, an auxiliary disk drive 22, and a printer 24. For purposes of protection during the transport of the system 10, the upper surface of the keyboard 32 covers the front surface of the input/output module 26.

The selection of the types of component modules included in computer system 10, and the order of their arrangement is merely illustrative. An integral electrical bus is formed by the interconnection of the modules comprising the system 10, allowing the modules to be interconnected in virtually any order or combination. As will be discussed in greater detail, each component module 12 through 24 contains a bus assembly which, when electrically interconnected, establishes electrical continuity between all modules of the system 10.

Each of the modules in system 10 has a substantially equivalent cross section. Thus, the rear surface 36 of the input/output module 26 has height and width dimensions corresponding to the dimensions of the front and rear surfaces 38 and 40, respectively, of component modules 12 through 24. Similarly, the front surface 42 of the power supply module 28 has height and width dimensions corresponding to the rear surface 36 of the input/output module 26 and the front and rear surfaces 38 and 40 of the remaining modules comprising the system 10. By so dimensioning the modules 12 through 28, the computer system 10 has a uniform cross section throughout its length, thereby minimizing the work area required and facilitating the assembly and transport of the system.

Although it is desirable to dimension the height and width of each component module of system 10 similarly, the depth of each module may vary according to the volume necessary to contain a particular computer component. For example, in FIG. 1 the printer module is substantially larger than modules 12 through 18, which merely contain electronic circuitry requiring relatively little volume. Additional volume required for the containment of printing hardware in component module 24 is accommodated by increasing the depth of the module and maintaining the height and width of the module consistent with other components of the system 10. Thus, the volume and corresponding storage capacity of any module is preferably determined by varying the depth of the module, rather than its height or width.

As noted, component modules incorporating the present invention are both mechanically and electrically interconnected to form the modular computer system 10. Electrical interfacing of component modules incorporating the invention is accomplished by an integral bus system. Each module includes an individual bus assembly for transmitting electrical signals between adjacent component modules. When such component modules are interconnected, as shown in FIG. 1, the bus assemblies of each module also interconnect to form an integral bus between all modules comprising the system. Thus, the integral bus is formed merely by electrically interconnecting adjacent modules of the system 10.

FIG. 1A illustrates an assembled modular computer system 11, which includes a minimum combination of computer components. Specifically, the system 11 includes a keyboard 32, an input/output module 27, a CPU/memory module 12 and a protector module 29. The keyboard 32 and the CPU/memory module 12 are substantially identical in structure and function to modules 12 and 32 of FIG. 1. Data from the keyboard 32 is input to the input/output module 27, which includes an LCD display 33, via line 34. The input/output module 27 is, in turn, coupled to the module 12, which comprises the central processing unit and memory of the computer system 11. Coupled to the rear surface of the module 12 is the protector module 29, which contains no electronics and which is used exclusively to protect the rear surface of the module 12. It will be apparent that the system 11 requires only a minimum level of electrical power for its operation, functioning with power supplied by a battery contained by the module 12 and without the need of a power supply similar to module 28 of FIG. 1. Moreover, any component module containing electronics requiring only a minimum level of electrical power preferably includes a battery which services the module component, thus, eliminating excessive power supply capacity from the system which must otherwise be needlessly carried by the user when transporting the system.

The input/output module 27 is shown in a horizontal position, as opposed to the vertical orientation of the input/output module 26 of FIG. 1. The input/output module 27 contains a means for adjusting the tilt angle of the LCD display to provide a proper viewing angle, such as a hinge affixed to a longitudinal edge of the LCD display 33. During transport of the system 11, the keyboard 32 is inverted over the LCD display and secured thereto to protect both modules from damage.

FIG. 2 illustrates external portions of the bus assembly of a typical component module 44, which may contain virtually any type of computer component, and a typical input/output module 46. It is important to note that the rear surface of the component module 44 (not shown) corresponds with and is identical to the rear surface 40 of the input/output module 46. The height and width of the module surfaces 38 and 40 are substantially identical, such that when the modules 44 and 46 are mechanically interconnected, the edges of the surfaces 38 and 40 are aligned.

Electrical interconnection of the modules 44 and 46 is accomplished by the engagement of a connector 48 of module 44 with a receptacle 49 of module 46. The connector 48 preferably comprises an array of conventional printed circuit board surface connectors extending outwardly from the front surface 38 of the module 44. The external dimensions of the connector 48 are substantially equivalent to the internal dimensions of the receptacle 49, such that the connector 48 can be inserted therein.

The location of the connector 48 and the receptacle 49 on their respective module surfaces is an important feature of the present invention. The connector 48 and the receptacle 49 are disposed at corresponding locations on their respective surfaces 38 and 40 such that the connector 48 will engage the receptacle 49 as the module 44 is mechanically interconnected with the module 46. Thus, as the module 44 is mechanically connected to the module 46, with the edges of module surfaces 38 and 42 abutting and in alignment, the electrical interconnection of the modules is established by the engagement of the connector 48 with the receptacle 49.

Each component module of the system 10 of FIG. 1 includes a similar connector and receptacle disposed in the same relative location on the front and rear surfaces thereof. This allows each module to be mechanically and electrically connected with any other module included in the modular computer system. It will be apparent that the rear surface 36 of the input/output module 26 shown in FIG. 1 is substantially identical to the rear surfaces 40 of the component modules of system 10, allowing its electrical connection to any component module included in the system. Similarly, the front surface 42 of the power supply module 28 shown in FIG. 1 includes a connector similar to the connector 48 shown in FIG. 2, allowing its engagement with the receptacle of any component module of the system.

FIG. 3 illustrates in more detail the bus assembly of typical component modules. A typical module 51 is shown containing a printed circuit board 53, on which is mounted a computer component (not shown), such as a CPU chip, a ROM chip, a RAM chip, a bubble memory drive, etc., or any combination thereof. Extending from the printed circuit board 53 is a connector 54, a portion of which extends through the front surface 52 of the module 51. The connector 54 includes an array of electrical contacts 56. A corresponding array of contacts is also disposed within a receptacle (not shown) extending into the rear surface of the module 51. The contacts within the receptacle of the module 51 are arranged such that each contact is disposed directly opposite and in alignment with a corresponding contact 56 of the connector 54. Each pair of corresponding contacts are electrically interconnected for the transmission of a specific electrical signal therebetween. Thus, the array of contacts of the module connector 54 will engage and electrically connect with electrical contacts of any module receptacle, thereby allowing transmission of discrete electrical signals between adjacent component modules. For example, modules 55 and 57 may be electrically connected by the engagement of the connector 59 of the module 57 with the receptacle (not shown) of module 55. The connector 54 of the component module 51 comprises conventional printed circuit board surface connectors disposed in a predetermined arrangement. A printed circuit board surface connector allows the electrical interconnection of parallel printed circuit boards such as boards 50 and 53 of FIG. 3. Each surface connector includes a conductor having an end portion bent to act as a leaf spring, which presses against a small pad of conductive material etched into the surface of the printed circuit board. The opposite end of the surface connector likewise includes a portion bent to form a leaf spring, which abuts and presses against a similar pad of conductive material etched in the face of a neighboring circuit board. Surface connectors suitable for use in the present invention are identified as "TKC" connectors manufactured by Teledyne Kinetics.

The operation of such printed circuit board connectors may be explained with reference to FIG. 3. The printed circuit board 53 shown therein is oriented parallel to the front surface 52 and the rear surface (not shown) of the component module 51. The connector 54 is mounted on the printed circuit board 53 within the component module 51 and extends perpendicularly from the printed circuit board. A similar arrangement of surface connectors comprises the connector 59 of the component module 57.

The component modules 55 and 57 are capable of mechanical and electrical interconnection in a manner similar to the interconnection of component modules 51 and 55. Accordingly, as the component module 57 approximates the component module 55, its connector 59 extends into the aperture 58 of the receptacle on the rear surface of the module 55. As the module 57 fully engages the module 55, the leaf spring contacts 56 of the connector 59 contact the conductive pads etched in the rear side of the printed circuit board 50. As an alternative, the connectors of the component modules 51, 55 and 57 may comprise well-known 2-part (male and female) edge finger connectors or printed circuit board 2-part pin connectors.

Further, the electrical connection of an input/output module (such as module 26 of FIG. 1) and a power supply module (such as module 28 of FIG. 1) in the system 10 is accomplished by the use of the aforementioned connectors and receptacles. Accordingly, the rear surface of the input/output module includes a receptacle which is capable of engaging any module connector, while the front surface of the power supply module includes a connector which is capable of engaging the receptacle of any module. As discussed, the locations of receptacle and connector of the input/output module and the power supply modules are substantially identical to those of all modules of the system, thereby facilitating their interconnection with an adjacent module.

It will be apparent that the electrical interconnection of a series of component modules creates an integral bus which establishes electrical continuity between interconnected modules. The standardization of the module connector and receptacle dimensions and placement, and the standardization of the arrangement of the contacts of the connector and receptacles allows the component modules to be assembled in virtually any order.

Figure 4:
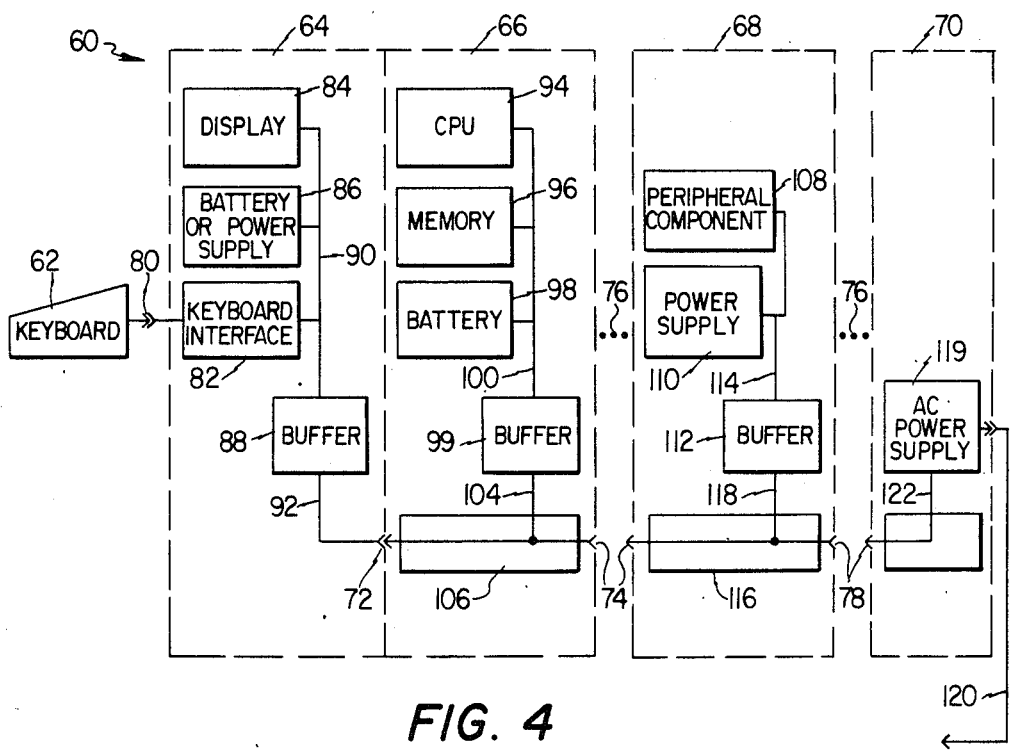
FIG. 4 is an electrical schematic diagram of a modular computer system incorporating the present invention.

An electrical schematic diagram of a system 60 incorporating the present invention is shown in FIG. 4. The system comprises a keyboard 62, an input/output module 64, a CPU/memory module 66, a typical component module 68 and a power supply module 70. Electrical continuity is established between modules 64, 66, 68 and 70 by means of bus interfaces 72, 74 and 78, which represent the interconnection of the connectors and receptacles of adjacent component modules. As is represented by the ellipses 76, additional component modules may be included in the system 60 without disrupting the continuity of the integral bus.

Each module of the present invention contains one or more electronic components, each electrically connected to the bus assembly of each module. For example, in FIG. 4, the module 64 contains a keyboard interface 82, to which the keyboard 62 is electrically connected through interface 80. Also contained within the module 64 are a display 84 and a battery 86. Each component within the module 64 is electrically connected to a bus buffer 88 within the module, via module bus line 90. The bus buffer 88 is, in turn, electrically connected to the interface 72 between adjacent modules 64 and 66, via line 92. As noted, the electrical interface 72 is established by the interconnection of a receptacle of module 64 with a connector of module 66. The interface 72 constitutes an electrical bus establishing continuity between the adjacent modules 64 and 66.

For purposes of example, the component module 66 comprises the CPU/memory for the system 60. Contained within component module 66 are a central processing unit ("CPU") 94, a memory unit 96, and a battery 98. Such components are electrically connected to a module bus buffer 99 within the module, via a module bus line 100. The bus buffer 99 is, in turn, electrically connected to a module bus assembly 106 via line 104.

The bus assembly 106 of the module 66 establishes electrical continuity between the adjacent modules 64 and 68 through interfaces 72 and 74, respectively. The interface 72 with adjacent module 64 is established by the engagement of an electrical connector, such as the connector 48 shown in FIG. 2, with the receptacle of the module 64. The interface 74 between the modules 66 and 68 is, similarly, established by the engagement of a receptacle mounted on module 66, such as receptacle 49 of FIG. 2, with a connector mounted on the module 68, such as the connector 48 of FIG. 2.

The module bus assembly 106 transmits to the adjacent module 68 all electrical signals sent and received by the input/output module 64. Access to the module bus assembly 106 by the components within the module 66 is provided by line 104, bus buffer 99, and module bus assembly 106. Module bus assembly 106 and line 104 preferably comprise a printed circuit board, such as the printed circuit board 53 shown in FIG. 3, having components 94, 96 and 98 mounted thereon. It will be apparent that only those data channels of the module bus assembly 106 necessary for the operation of components within the module 66 are accessed via line 104.

Module 68 of system 60 represents a typical component module, containing virtually any type of peripheral component required for a particular application of the system 60. The component module 68 contains a peripheral component 108, such as additional ROM or RAM capacity, a disk drive, a bubble memory, a printer, a telephone modem, a "mouse" interface, etc., or any feasible combination thereof. A power supply 110, preferably a battery, is also provided within the component module 68, if necessary for continued operation of the peripheral component 108 when the module 68 is separated from the system 60 or when the supply of power to the system 60 is disrupted. The power supply 110 can also provide electrical power to the component module 68 directly from the power supply module 70, via the module bus assembly 116 and the module bus line 114. The peripheral component 108 and the power supply 110 are electrically connected to a bus buffer 112 via line 114. The bus buffer 112, in turn, is connected to a module bus assembly 116 via line 118. The structure and function of the module bus assembly 116 and line 118 are preferably similar to the module bus assembly 106 and line 104 of component module 66 discussed previously. Accordingly, the module bus assembly 116 and line 118 may comprise a printed circuit board similar to the printed circuit board 53 of FIG. 3.

The module bus assembly 116 of the module 68 is substantially identical to the bus assembly 106 of the module 66. Accordingly, electrical continuity is established between component modules adjacent the module 66 by the engagement of neighboring module connectors and receptacles. It will be understood that virtually any combination or arrangement of additional component modules, each having substantially identical module bus assemblies, may be interposed between modules 66 and 68, and between modules 68 and 70, as is indicated by ellipses 76. The addition of such modules to the system 60 by the interconnection of the bus assemblies of adjacent component modules will maintain electrical continuity between all component modules of the system by forming an integral bus therebetween. Thus, the present invention obviates the need of cables or a "mother board" to electrically interconnect system components.

The supply of electrical power for the system 60 of FIG. 4 is provided by a power supply module 70. Contained within the module 70 is an AC power supply unit 119, which is connected to an external power source via line 120. The power supply unit 119 is electrically connected via bus line 122 to the remainder of the system 60 through an interface 78. The interface 78 is established by the engagement of a connector mounted on the module 70, such as the connector 48 of FIG. 2, with the receptacle of the adjacent module 68. The power supply module 70 is preferably not provided with a receptacle requiring that the power supply module be the last in the series of modules comprising the system 60. This feature substantially reduces the hazard posed to the user during assembly and disassembly of the system 60 by exposed receptacle contacts.

Figure 5:
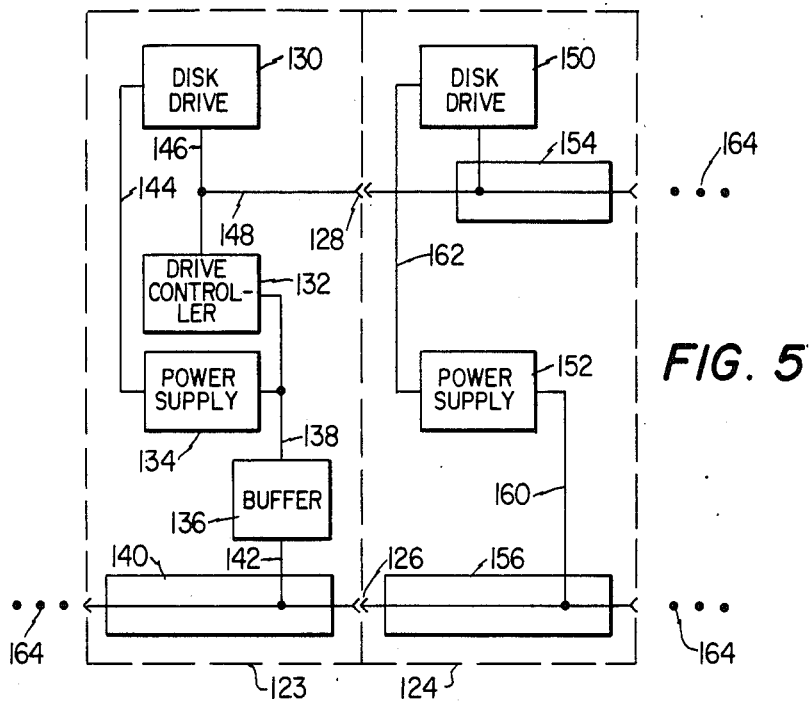
FIG. 5 is an electrical schematic diagram illustrating the electrical interface of adjacent disk drive modules incorporating the present invention.

Although the present invention contemplates a system of modular computer components which may be interconnected in virtually any combination and arrangement desired, it may be desirable to equip each disk drive module of the system with an additional bus assembly allowing control of adjacent disk drives by one disk drive controller. Such an arrangement is schematically illustrated in FIG. 5. A master disk drive module 123 is shown electrically connected to an auxiliary disk drive module 124 both by a system interface 126 and a disk drive control interface 128. The system interface 126 services the entire computer system, while the disk drive control interface 128 services only adjacent disk drive units.

The master disk drive module 123 contains a disk drive unit 130, a disk drive controller 132 and a power supply 134. The disk drive controller 132 and the power supply 134 are electrically connected to a bus buffer 136 via a module bus 138. The bus buffer 136 is, in turn, electrically connected to a module bus assembly 140 via a line 142. The module bus assembly 140 is substantially identical in structure and function to the module bus assemblies 106 and 116 previously discussed with reference to FIG. 4. Data and electrical power necessary for the operation of the disk drive unit 130 are transmitted from the system bus via the module bus 138 to the disk drive controller 132 and the power supply unit 134. Electrical power is, in turn, transmitted from the power supply unit 134 to the disk drive unit 130 via line 144. Control of the disk drive unit 130 by the disk drive controller 132 is accomplished via line 146.

The disk drive controller 132 of the master disk drive module 123 is electrically connected to auxiliary disk drive units via line 148. Line 148 terminates in a bus assembly receptacle similar to those previously discussed. The receptacle must be mounted at a predetermined location for engagement with a connector of an adjacent disk drive unit, which is also similar in structure and function to connectors previously discussed.

The auxiliary disk drive module 124 adjacent the master disk drive module 123 contains a disk drive unit 150, a power supply unit 152, a disk drive bus assembly 154, and a module bus assembly 156. Control of the disk drive unit 150 is accomplished through the interconnection of the disk drive bus assembly 154 with the master disk drive module through the interface 128. The disk drive bus assembly 154 is similar in structure and function to the module bus assemblies of each component module, having a connector extending from the front surface of the auxilary disk drive module 124 and a receptacle extending inwardly from the rear surface of the module 123. Electrical continuity of specific electrical signals necessary to control the disk drives of adjacent auxiliary disk drive units is established by the interconnection of consecutive disk drive bus assemblies. For example, control of the disk drive unit 150 by the disk drive controller 132 of the master disk drive module 123 is accomplished via the disk drive bus assembly 154 and line 148.

Electrical power is supplied to the disk drive unit 150 of the auxiliary disk drive module 124 from the system bus. Specifically, electrical power from the module bus assembly 156 is transmitted to the power supply unit 152 via line 160. The power supply unit 152, in turn, transmits power to the disk drive unit 150 via line 162.

As is indicated by ellipses 164, additional auxiliary disk drive units, or other modular components, may be added to the system shown in FIG. 5. Additional auxiliary disk drive units embodying this feature of the invention must be grouped adjacent each other to allow continuous interconnection of their respective disk drive bus assemblies to form an integral disk drive bus therebetween. If it is desired that other types of component modules be interconnected with the auxiliary disk drive module 124, only the module bus assembly of the component module must be interconnected with the module bus assembly 156 of the auxiliary disk drive module 124.

Figure 6:
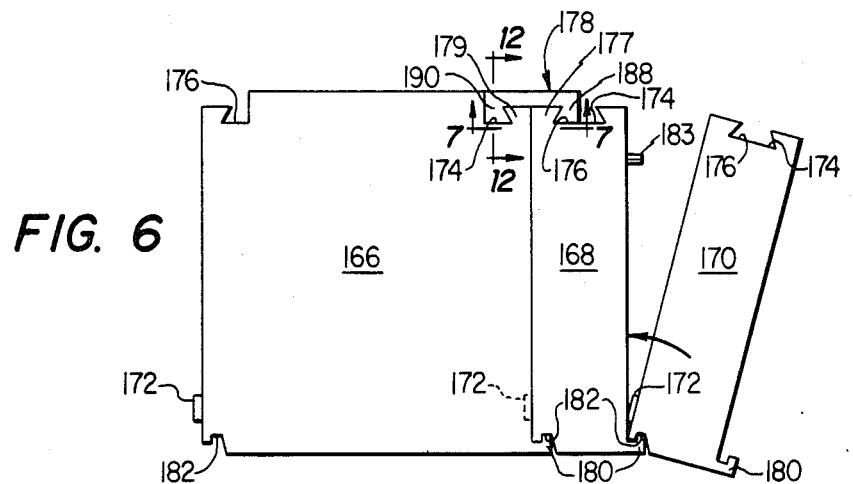
FIG. 6 is a side view illustrating the mechanical interconnection of adjacent computer modules incorporating the present invention.

As previously discussed, an important feature of the present invention is the ability to mechanically interconnect adjacent modules, thereby facilitating portage of the computer system and reducing the work space required for the assembled system. FIG. 6 illustrates a preferred means of mechanically interconnecting the upper and lower edges of adjacent computer modules for this purpose. A side view is shown in FIG. 6 of two interconnected modules 166 and 168, and a module 170 which is partially connected to the module 168. The rear surface of each of the modules shown in FIG. 6 face to the right, while the front surface of each module is shown facing to the left.

Each of the modules 166, 168 and 170 includes a receptacle (not shown) and a connector similar to the connector 48 and the receptacle 49 shown in FIG. 2—the connectors extending from the front surface of each module and the receptacles extending inwardly from the rear surface of each module. Mechanical interconnection of adjacent modules is facilitated by disposing partial dovetail grooves 174 and 176 immediately adjacent the respective front and rear surfaces of each of the modules 166, 168 and 170 at a predetermined distance therefrom. The modules 168 and 170 are of a minimum depth, such that the grooves 174 and 176 thereof are disposed immediately adjacent each other and therefore appear to constitute a single dovetail groove. In contrast, the partial dovetail grooves 174 and 176 of the relatively larger module 166 are disposed separately, as is required by the depth of the module 166.

Once two modules are placed adjacent each other, as are modules 166 and 168, a dovetail slide 178 is utilized to engage the adjacent dovetail grooves 174 and 176, thereby securing together the upper edges of the abutting surfaces of modules 166 and 168. The partial dovetail groove 176 actually consists of a number of individual partial tapered dovetail grooves which mate with similar tapered dovetail sections of the dovetail slide 178, the construction of which is discussed in greater detail within. A similar procedure is used to secure the upper edges of modules 168 and 170. Moreover, the lower edges of adjacent modules can be secured together using a similar technique.

Alternatively, the lower edges of the modules 166, 168 and 170 are secured together by the engagement of corresponding mating surfaces extending along the lower edges of the front and rear surfaces thereof. Specifically, each module 166, 168 and 170 includes a tongue 180 extending upwardly from the lower edge of its rear surface. In addition, each of the modules includes a groove 182 disposed adjacent the lower edge of the front surface of each module. The tongue 180 and groove 182 of each module 166, 168 and 170 are of a standard size and shape, allowing engagement of any module tongue 180 with the groove 182 of any neighboring module.

The procedure for mechanically and electrically interconnecting adjacent modules may be described with reference to FIG. 6. The groove 182 of the module 170 is first placed over the tongue 180 of the adjacent module 168, with the connector 172 substantially aligned with the receptacle of the module 168. A tab in the groove 182 and a notch in the tongue 180 may also be incorporated to allow engagement of the groove and tongue only when their respective modules are laterally aligned. The module 170 is then pivoted counterclockwise about tongue 180 of the adjacent module 168. As module 170 pivots, its connector 172 will engage the receptacle of the module 168. Once the front surface of module 170 abuts the rear surface of the module 168, a dovetail slide 178 is slid into engagement with the partial dovetail grooves 174 and 176 of the abutting modules 168 and 170.

It will be understood that a partial dovetail groove similar to groove 176 and a tongue similar to tongue 180 are included adjacent the rear surface of an input/output module embodying the present invention. For example, such a partial dovetail groove and tongue would be disposed adjacent the rear surface 36 of the input/output module 26 of FIG. 1, thereby allowing its interconnection to an adjacent component module, such as module 12, in a manner similar to the interconnection of modules 168 and 170 in FIG. 6.

In addition, it will be understood that a partial dovetail groove similar to dovetail groove 174 and a groove similar to groove 182 of FIG. 6 are provided adjacent the front surface of a power supply module incorporating the present invention. For example, such grooves may be provided adjacent the front surface 42 of the power supply module 28 shown in FIG. 1. The presence of such grooves will allow the interconnection of the power supply module 28 with the adjacent module 24.

The mechanical interconnection of adjacent modules in the manner shown in FIG. 6 and previously described substantially secures adjacent modules from vertical and lateral movement with respect to each other. The securing of the upper ends of adjacent modules by means of the dovetail slides 178 and the securing of the lower ends of each module by the mating of the tongues 180 with the grooves 182 prevents both the separation of adjacent modules and vertical sliding with respect to each other. In addition, the mating of the connector and receptacle of adjacent modules, such as the engagement of the connector 172 with the receptacle of module 168 (not shown), further inhibits the vertical and lateral movement of adjacent modules with respect to each other. If desired, one or more guide pins 183 are provided, extending from the rear surface of each of the modules 166, 168 and 170 shown in FIG. 6. Each guide pin 183 engages an aperture (not shown) extending through the front surface of each module at a corresponding location, thereby guiding the engagement of the receptacle and connector of adjacent modules and further restraining the relative movement of adjacent modules. It will be apparent that other types of guide means, forming an integral part of the casing of each module, can be incorporated to facilitate the mechanical interconnection of adjacent modules.

Figure 7:
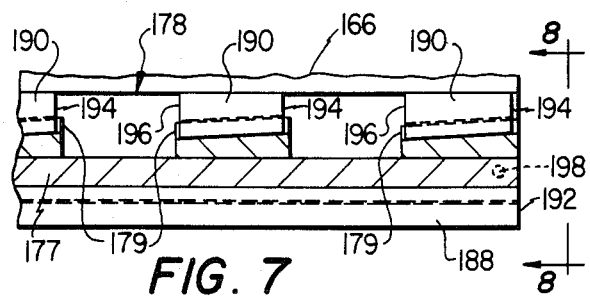
FIG. 7 is a partial sectional view, taken along section line 7—7 in FIG. 6, illustrating the mechanical interconnection of adjacent computer modules incorporating the present invention.
Figure 8:
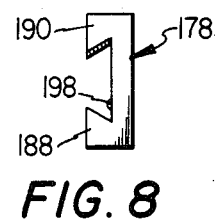
FIG. 8 is an elevation of the dovetail slide shown in FIG. 7, taken along a section line 8—8.

A preferred design of a dovetail slide for mechanically interconnecting adjacent modules is shown in FIGS. 7 and 8. A partial sectional view, taken along line 7—7 of FIG. 6, of the dovetail slide 178 as it fully engages modules 166 and 168 is shown in FIG. 7. A side view of the slide 178 only, taken along line 8—8, is depicted in FIG. 8.

The construction of the dovetail slide 178 facilitates the interconnection of adjacent modules by minimizing friction between the surfaces of the slide 178 and modules which it secures. A continuous partial dovetail 188 extends along a longitudinal edge of the slide 178. Mounted along the opposite edge of the slide 178 are a number of tapered partial dovetail sections 190. The tapered dovetail sections 190 are preferably spaced apart uniformly along the edge of the slide 178. The dovetail slide 178 is held captive by the continuous partial dovetail 177 of the module 168 with which the slide mates.

The configuration of each of the tapered dovetail sections 190 minimizes the friction encountered as the slide 178 is slid into engagement with the partial dovetail grooves of adjacent modules by providing additional clearance between the modules and the slide 178. Each dovetail section 190 is tapered toward the end 192 of the slide 178, which first engages a pair of adjacent modules. Thus, the front end 194 of each dovetail section 190 is spaced apart from the dovetail 188 on the opposite side of the slide 178 a greater distance than are the partial dovetail grooves which the slide 178 engages. However, the rear end 196 of each tapered dovetail section 190 is spaced from the dovetail 188 a distance substantially equivalent to the distance separating the partial dovetail grooves of neighboring modules.

It will be apparent that a similar construction can be incorporated with all modules of the present invention. For example, each such module includes a continuous partial dovetail, similar to partial dovetail 177, adjacent the upper edge of its front surface and further includes a set of equally spaced partial dovetail sections, such as sections 179, adjacent the upper edge of its rear surface. Neighboring modules are mechanically interconnected by means of a dovetail slide, similar to slide 178, in the manner previously discussed with reference to FIGS. 6, 7 and 8.

FIG. 7 illustrates the dovetail sections 190 of the slide 178 fully engaging the partial dovetail grooves 179 of module 166. It will be apparent that the partial dovetail sections 190 of the slide 178 are spaced apart sufficiently to allow their insertion between the partial dovetail grooves 179 as the front and rear surfaces of respective modules 168 and 166 abut. Once the modules 166 and 168 are fully abutting, the slide 178 is slid in the direction of the taper of its dovetail sections 190, which then engage the partial dovetail grooves 179 of the module 166. The module 168 is disconnected from the module 166 by first sliding the dovetail slide 178 out of engagement with the partial dovetail grooves 179 to a position where each of the partial dovetail sections 190 is adjacent an opening between the partial dovetail grooves 179. The partial dovetail segments 190 pass through the openings between adjacent partial dovetail grooves 179 as the modules 166 and 168 are separated.

As the slide 178 engages the partial dovetail grooves, the additional clearance reduces the contact and friction between the surfaces of the tapered dovetail grooves 179 of the module 166 and the tapered dovetail sections 190. This substantially reduces the effort required to engage the slide 178 with adjacent modules. Moreover, the taper of each dovetail section 190 facilitates the initial engagement of the front end 194 of each dovetail section 190 with the partial tapered dovetail grooves of an adjacent module. In addition, the taper of dovetail section 190 causes a cinching effect as the slide 178 engages the grooves of an adjacent module.

The dovetail slide 178 further includes a spring-loaded locking detent 198 disposed adjacent the front end 192 thereof. The locking detent 198 is offset from the centerline of the slide 178 toward the dovetail 188. The detent 198 engages a recess (not shown) located on one of two adjacent modules once the slide 178 is fully engaged, thereby securing the slide against accidental disengagement.

Figure 9:
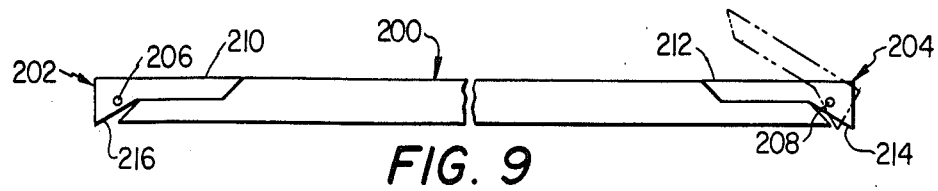
FIG. 9 is a side view of a dovetail slide used to mechanically interconnect computer modules incorporating the present invention.

FIG. 9 illustrates a dovetail slide 200 incorporating levers 202 and 204 which facilitate its engagement and disengagement with adjacent modules. Each of the levers 202 and 204 are pivotally mounted on opposite ends of the slide 200 by pins 206 and 208, respectively. The levers 202 and 204 are normally in the position shown, with their respective arms 210 and 212 resting against the upper surface of the slide 200.

As the slide 200 nears full engagement with adjacent modules, the lever 204 can be pivoted to the position shown by the broken lines. Pivoting of the lever 204 causes the contact surface 214 thereof to bear against the underlying module, thereby drawing the slide 200 into full engagement. To facilitate disengagement of the slide 200, lever 202 can be pivoted in a manner similar to the lever 204, causing its bearing surface 216 to contact the module and draw the slide 200 out of full engagement with the underlying modules.

An important feature of the present invention is the ability to transport an assembled system of computer modules. Once the modules have been secured together in the manner shown in FIG. 6, a carrying handle may be affixed to any module comprising the assembled system to facilitate portage of the system. For example, the modules illustrated in FIG. 1 each includes an aperture 184, for receiving a quarter turn fastener, extending partially through its lateral surface adjacent the upper edge thereof. An additional aperture 185 for receiving a quarter turn fastener is located on the lateral surfaces of the input/output module 26 and the printer module 24 midway between the upper and lower surfaces thereof. Similar apertures (not shown) are located at corresponding locations on the opposite ends of each of the modules. A carrying handle 189 having quarter turn fasteners 187 mounted on the ends thereof may be connected to the apertures 184 of any module of the system 10.

As previously discussed, the system created by the interconnection of adjacent modules includes one or more bus lines for supplying electrical power to the system from a power supply module. Preferably, 110 volts AC are supplied to the system from a power supply module via the system bus for higher power consuming modules. For example, electrical contacts 218 and 220 of the connector 54 shown in FIG. 3 are reserved for the transmission of electrical power to the receptacle contacts of an adjacent module.

Such high voltage is not normally transmitted through typical electronic buses. Due to such voltage, it is desirable that the contacts 218 and 220 be relatively isolated from other contacts on the connector 54, thereby minimizing the risk of damage to adjacent contacts or to components of the computer system caused by an electrical arc forming either between the contacts 218 and 220 themselves or between the contacts 218 and 220 and neighboring contacts. Such isolation is preferably provided by locating the contacts 218 and 220 at one end of the connector 54 and positioning the next adjacent contacts at a predetermined distance therefrom.

FIGS. 10, 11, 12, 13 and 14 illustrate various safety means for protecting the modular computer system from damage caused by the formation of an electrical arc between receptacle and/or connector contacts during the assembly, disassembly, or rearrangement of the system. Specifically, such safety means disrupt the supply of power to the system prior to or upon disengagement of any two adjacent modules. Thus, the user is thereby also protected against the possibility of electrical shock from exposed receptacle or connector contacts.

Figure 10:
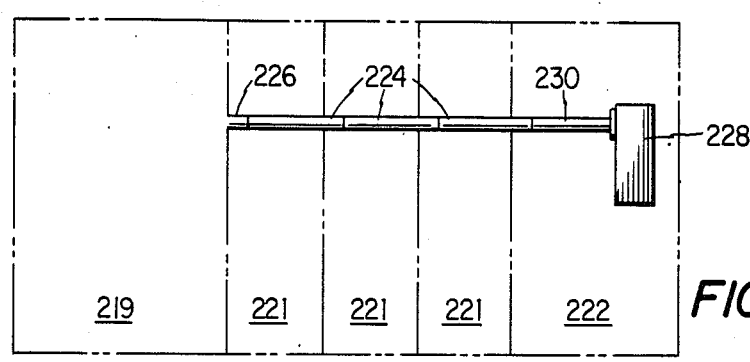
FIG. 10 is a schematic diagram illustrating a pin member assembly for disrupting the supply of electrical power to an assembled modular computer system incorporating the present invention.

FIG. 10 is a schematic illustration (side view) of a mechanical means for disrupting the supply of power to the computer system upon separation of any pair of adjacent modules. The system shown includes an input-/output module 219, a number of component modules 221, and a power supply module 222. The system shown in FIG. 10 utilizes a relay of pin members 224, each slidably mounted in an aperture extending through each of the component modules 221. The pin members 224 are biased toward a central location within each of the component modules 221 such that they do not normally extend from their respective modules. A pin member 226 is also mounted on the rear surface of the input/output module 219. Yet another pin member 230 is disposed within the power supply module 222 and is slidably mounted on an electrical switch 228.

The switch 228 serves to disrupt the supply of power to the system when the pin member 230 is in its normally extended position. As the modules 219, 221 and 222 are interconnected, the pin member 226 of the input/output module 219 displaces the pin members 224 of the component modules 221, which in turn displace the pin member 230 of the electrical switch 228 contained by the power supply module 222, thereby supplying power to the system. It will be apparent that the separation of any pair of adjacent modules will allow extension of the pin member 230 of the electrical switch 228, immediately disrupting the supply of power to the system.

Figure 11:
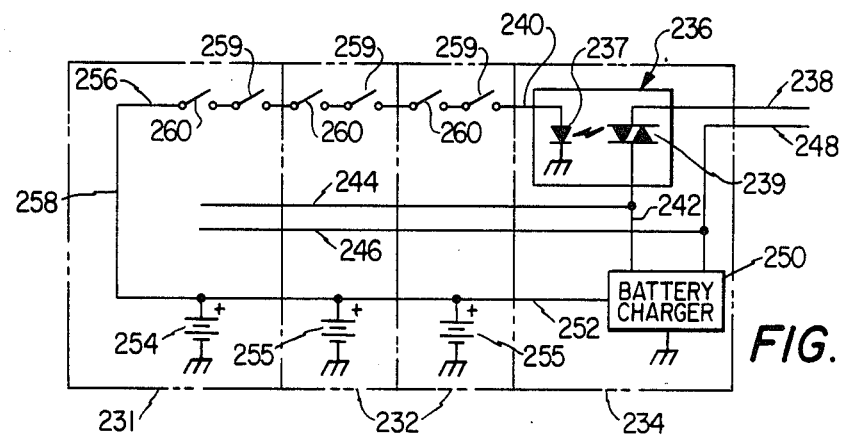
FIG. 11 is an electrical schematic diagram of a safety circuit for disrupting the supply of electrical power to a modular computer system incorporating the present invention.

FIG. 11 illustrates alternate safety means for disrupting the supply of power to the computer system upon separation of adjacent modules. The system shown in FIG. 11 is a typical arrangement of computer modules, including an input/output module 231, a number of component modules 232, and a power supply module 234. Interconnection of the components 231, 232 and 234 establishes a circuit within the integral system bus, which activates the power supply module 234.

The safety means shown in FIG. 11 principally includes an electronic switch 236 comprising an LED 237 and a triac detector 239, or other solid-state switch, which interrupts the supply of electrical power to the system from line 238 upon the disruption of an electrical signal from line 240. When a signal is received by the electronic switch 236 via line 240, relatively high voltage electrical power is supplied to the system via line 242. The high voltage electrical power is, in turn, supplied to the modules 231, 232 and 234 from line 242 via a power bus 244. A neutral bus 246, which is electrically connected to a neutral line 248 in the power supply module 234, also services the system shown.

The power supply line 242 and the neutral line 248 are electrically connected to a low voltage/high current battery charger 250 within the power supply module 234. The battery charger 250 preferably generates a 5 VDC current, or other appropriate voltage, when electrical power is supplied to the system. The low voltage signal charges a battery 254 housed within the input/output module 231, and batteries contained by any other module of the system, such as batteries 255, via a low voltage bus 252. It will be apparent that the battery 254 is required to energize the detector 236 when the system is first assembled.

A low voltage signal from the battery 254 is transmitted to a safety bus 256 via line 258 within the input/output module 231. As previously discussed, electrical power will be supplied to the system via the line 242 only when the safety bus 256 establishes continuity between the battery 254 in the input/output module and the detector 236 in the power supply module 234. The safety bus 256 passes through a number of interlock switches 259 and 260, which are connected in series. Accordingly, each of the interlock switches 259 and 260 must be closed before the detector 236 will transmit power to the system.

The modules 231 and 232 each contains a first interlock switch 259 and a second interlock switch 260. The first interlock switch 259 of each module is preferably closed upon the interconnection of the upper edge of the rear surface of the module with the upper edge of an adjacent module. Similarly, each of the second interlock switches 260 is preferably closed upon the interconnection of the lower edge of the rear surface of each module with an adjacent module. Thus, the continuity of the safety bus 256 can only be established by the proper mechanical interconnection of adjacent modules.

In addition, it will be apparent that each of the buses 244, 246, 252 and 256 are incorporated in the integral system bus of the present invention. Thus, a second degree of redundancy is afforded by the requirement that electrical continuity of the system bus be established by the engagement of the connectors and receptacles of adjacent modules. Accordingly, the separation of the upper or lower edges of adjacent modules or the mere disruption of the electrical continuity of the safety bus 256 or the integral system bus will immediately terminate the supply of electrical power to the system. Even when the modules are separated, enabling the interlock switches 259 and 260 will not enable the supply of power to the system due to the electrical discontinuity of the safety bus 256.

Figure 12:
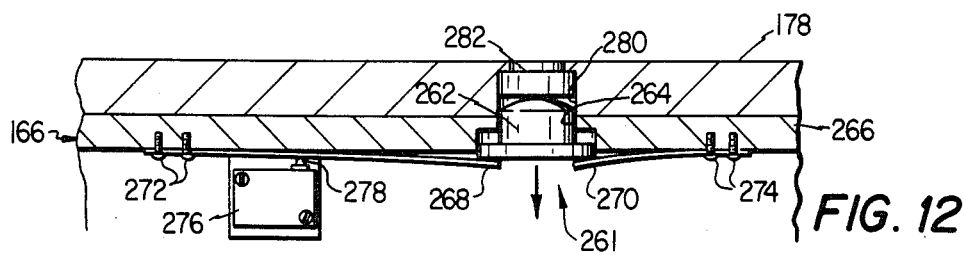
FIG. 12 is a partial sectional view of the upper surface of a component module shown in FIG. 6, taken along section line 12—12, illustrating a safety interlock switch.
Figure 13:
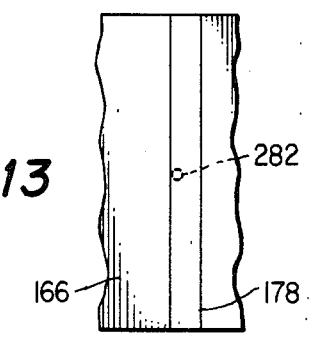
FIG. 13 is a partial top view of the interface between interconnected computer modules, illustrating a safety interlock.
Figure 14:
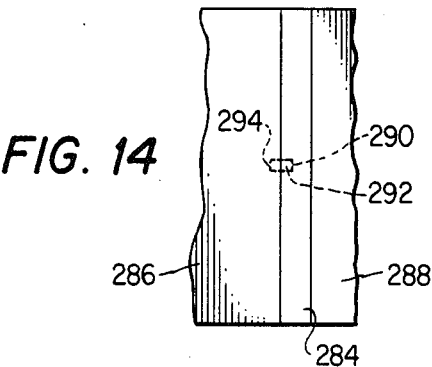
FIG. 14 is a partial top view of the interface between adjacent computer modules, illustrating a safety interlock.

Alternative types of interlock switches are shown in FIGS. 12, 13 and 14. Such interlock switches are disposed adjacent the upper edge of the rear surface (or front surface) of each module and will close to establish electrical continuity of the safety bus only when dovetail slides fully engage the upper edges of pairs of adjacent modules. In addition, if the dovetail slide assembly is utilized or interconnects the lower edges of adjacent modules, similar interlock switches may be used to establish electrical continuity of the safety bus only when the slides of all pairs of adjacent modules are fully engaged.

FIG. 12 schematically illustrates a typical interlock switch assembly 261, which is preferably mounted within each of the partial dovetail grooves 176 of the modules 166 through 170 of FIG. 6. For purposes of example, the switch assembly 261 of the module 166 of FIG. 6 is shown. Accordingly, FIG. 12 is a partial cross section of the upper end of the module 166, taken along line 12—12. It will be apparent that the switch assembly 261 can be included in any module incorporating the present invention.

The interlock switch assembly 261 includes a cylindrical detent 262 slidably mounted within an aperture 264 which extends through the upper surface 266 of the component module 166. The detent 262 is supported by a pair of leaf springs 268 and 270, which are fastened to the upper surface 266 of the module 166 by a pair of fasteners 272 and 274, respectively. The leaf springs 268 and 270 urge the detent 262 upwardly, through the aperture 264.

Downward displacement of the detent 262 actuates a microswitch 276, which is affixed to the upper surface 266 of the module 166. The normally closed microswitch 276 includes an upwardly biased trigger 278 which abuts the lower surface of the leaf spring 268. The microswitch 276 is intended to serve both as a first interlock switch 259, in conjunction with a dovetail slide assembly on the upper surface of a module, and as an interlock switch 260, in conjunction with a dovetail slide assembly on the bottom surface of a module (if used), of the electrical system shown in FIG. 11 and discussed previously. Accordingly, only the first interlock switch 259 is required when the tongue and groove technique is used to secure the lower edges of modules comprising the system. Depression of the trigger 278 by the downward placement of spring 268 and the detent 262 activates and opens the microswitch 276, thereby disabling the supply of electrical power to the computer system. Conversely, deactuation of the switch 276 enables the supply of power to the system.

The interlock switch assembly 261 is shown securing a fully engaged dovetail slide 178 against lateral movement. The dovetail slide 178 includes an upwardly biased release button 282, which is slidably mounted within an aperture 280 extending through the dovetail slide 178. The aperture 280 is dimensioned and located suitably to receive the detent 262 when the dovetail slide 178 is fully engaged with the module 166.

When the module 166 is coupled to an adjacent module, the detent 262 is held depressed by the slide with its upper surface substantially flush with the upper surface 266 of the module 166. The dovetail slide 178 is then slid over the detent 262 into full engagement. As the dovetail slide 178 is fully engaged, the detent 262 is forced upwardly by springs 268 and 270 into the aperture 280 of the slides, thereby preventing disengagement of the dovetail slide. In this position, the detent 262 and spring 268 deactivate the trigger 278, thereby closing the microswitch 276 and enabling the supply of power to the computer system.

In order to disengage the dovetail slide 178, the release button 282 is depressed until the upper surface of the detent 262 is flush with the upper surface 266 of the module 166. The trigger 278 is then activated, opening the microswitch 276 and disabling the supply of power to the system. The dovetail slide 178 is then slid out of engagement with the module 168. At this point, the slide 178 holds the activated microswitch 276 in its open position, thereby maintaining the supply of electrical power to the computer system in a disabled state.

FIG. 13 is a top view of the dovetail slide 178 and the module 166 shown in FIG. 12, illustrating the location of the release button 282. The dovetail slide 178 is depicted fully engaging module 166 and an adjacent module. The release button 282 is offset from the longitudinal centerline of the dovetail slide 178 toward the module 166. In the position shown, the release button 282 is disposed directly above the detent 262 of the interlock switch assembly 261.

An alternate type of interlock switch assembly is schematically illustrated in FIG. 14. A dovetail slide 284 is shown fully engaging adjacent modules 286 and 288. The dovetail slide 284 includes a slot 290 into which fits a slide switch 292. The slide switch 292 is mounted on the module 286 and slides into and out of engagement with the slot 290 along a track 294. The slide switch 292 is intended to serve as interlock switches 259 and 260 of the system shown in FIG. 11 and discussed previously.

The slide switch 292 is closed when positioned as shown in FIG. 14, thereby enabling the supply of electrical power to the computer system. When the dovetail slide 284 is fully engaged, the slide switch is pushed into the slot 290 in the dovetail slide, thereby securing the slide against lateral movement and enabling the supply of power to the system. However, it will be apparent that the slide switch 292 must be placed in the open position during the engagement and disengagement of the dovetail slide 284, thereby disrupting the supply of electrical power to the computer system as the modules are coupled and uncoupled. Similar interlock switches may be used in conjunction with other types of fasteners for securing adjacent modules, such as quarter turn fasteners, etc. For example, if a quarter turn fastener is used to secure adjacent modules together, a cam mounted on the rotatable lock is used to activate or deactivate a microswitch which disables and enables the power bus.

Figure 15:
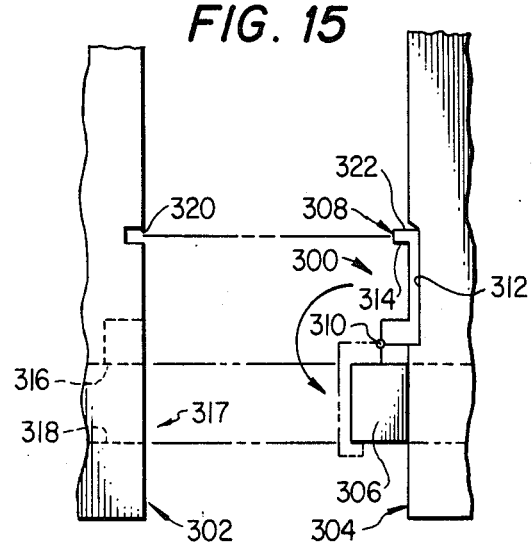
FIG. 15 illustrates an integral removable cover for protecting a connector of a component module incorporating the present invention.

FIG. 15 illustrates a protective cover assembly 300, which is mounted on the male connector surface of each module. The cover assembly protects the connector contacts of each module when the module is not in use. FIG. 15 is a partial side view of sections of the female connector surface 302 and the male connector surface 304 of two modules embodying the present invention. Extending from the surface 304 is a connector 306. Pivotally mounted above the connector 306 by means of a hinge 310 is a cover 308. When the cover 308 is not utilized, it folds into a recess 312 in the surface 304 of the module. When the module is stored, the protective cover 308 can be pivoted downwardly into engagement (shown by broken lines) with the connector 306. The cover 308 includes a lip 314 which grips the connector 306 to hold the cover in engagement with the connector. The hinge 310 is spring loaded to force the cover 308 into the closed position. A latch is included at 322, which retains the cover 308 in the open position prior to interconnecting adjacent modules. As the modules are mated, a trigger within a groove 320 releases the latch 322. As the modules are later separated, the spring loaded hinge 310 will automatically pivot the cover 308 into the closed position, with the lip 314 securing the cover about the connector 306.

The corresponding module surface 302 shown in FIG. 15 is capable of mating with the connector 306 and cover assembly 300 of the module surface 304 when the cover 308 is retracted (shown by solid lines). The surface 302 includes a receptacle, the upper and lower edges 316 and 318 of which are spaced apart a sufficient distance to receive the connector 306 and the portion of the cover 308 immediately adjacent the hinge 310. In addition, the groove 320 is formed in the rear module surface 302 above the lower edge 318 of the receptacle to receive the lip 314 of the cover 308.

Although the preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

I claim:

1. A modular computer system, including one or more component modules, each comprising:
   a casing, including substantially parallel front and rear surfaces, said surfaces having a predetermined dimension;
   a computer component contained by said casing;

an array of surface-mount printed circuit board connectors extending outwardly from said front surface of said casing at a predetermined location, each connector incorporating a conductor having an end portion forming a leaf spring contact for abutting and establishing electrical connection with a surface contact of an adjacent module;

a receptacle extending into said casing from said rear surface, wherein interior dimensions of said receptacle substantially correspond to exterior dimensions of said array of connectors and said connectors are aligned with said receptacle;

an array of surface contacts mounted within the receptacle for abutting and establishing electrical connection with the leaf spring contacts of the connectors of an adjacent module;

a predetermined number of the contacts of the connectors and the receptacle being electrically connected to said component within said casing;

each of said connector contacts is electrically connected to a corresponding contact of said receptacle for transmitting a predetermined signal between said connector and receptacle, said corresponding contacts being aligned on said connector and receptacle such that two or more of said component modules may be stacked with said front end rear surfaces of adjacent modules abutting and with contacts of the connectors and receptacles of adjacent component modules abutting, thereby allowing formation of an electrical bus between adjacent modules with minimal frictional resistance; and further comprising an input/output module including:

a casing including a rear surface having dimensions substantially equilvalent ot the predetermined dimensions of said front and rear surfaces of said component module casing;

a keyboard interface contained by said input/output module casing;

a visual display contained by said input/output module casing;

an input/output receptacle extending into said input/output module casing from the rear surface thereof at a location corresponding to the location of said receptacle of said component module, wherein the interior dimensions of said input/output module receptacle are substantially equivalent to the exterior dimensions of said array of component module connectors; and said receptacle of said input/input module includes an array of surface contacts, a predetermined number of which are electrically connected to said display and keyboard interface within said input/output module casing, wherein each of said contacts of said input/output module is disposed in a predetermined location within said input/output module receptacle and interconnected with a corresponding contact of said component module connector.

means for mechanically securing together adjacent front and rear surfaces of two or more component modules.

2. The modular computer system according to claim 1, further comprising a power supply module for supplying electrical power to the modular computer system, including:

a casing including a front surface having dimensions substantially equivalent to the predetermined dimensions of said front and rear surfaces of said component module casing;

a power supply contained by said power supply module casing;

an array of surface-mount printed circuit board connectors extending outwardly from said front surface of said power supply casing at a location corresponding to the location of said array of connectors of each said component module for establishing electrical connection with an adjacent component module with minimal frictional resistance, wherein the exterior dimensions of said array of power supply connectors are substantially equivalent to the interior dimensions of said component module receptacle; and one or more of said connectors of said power supply module include a conductor having an end portion forming a leaf spring contact abutting and establishing electrical connection with a predetermined surface contact within said component module receptacle, for supplying electrical power to said component module.

3. The modular computer system according to claim 2, wherein said power supply module includes safety means for disrupting the supply of power from said power supply module to the modular computer system prior to dissengagement of said connector of said component module from said receptacle ofan adjacent component module.

4. The modular computer system according to claim 1, wherein each said component module casing, said power supply module casing and said input/output module casing each includes means for affixing a carrying handle thereto.

5. A modular computer system with integral bus, comprising:

one or more components modules each including:
(a) a computer component;
(b) a casing containing said component, said casing including opposing first and second surfaces of equivalent dimension;
(c) a bus assembly for electrical interconnection with an adjacent component module, said bus assebly including an array of surface-mount printed circuit board connectors extending outwardly from said first surface of said casing, forming a first array of leaf spring electrical contacts for abutting and establishing electrical connection with a corresponding array of surface contacts of an adjacent component module with minimal frictional resistance and a receptacle extending into said casing from said second surface thereof, having a second array of electrical surface contacts disposed therein for abutting and establishing electrical connection with a corresponding array of leaf spring contacts of an adjacent component module with minimal frictional resistance, said connector and receptacle being disposed in substantial alignment at opposing locations on said first and second surfaces of said casing, said first and second arrays of electrical contacts being arranged in aligned pairs at opposing locations on said connector and said receptacle, each of said aligned pairs of electical contacts being electrically interconnected and wherein a number of said electrical contacts are electrically connected to each said computer component; and (d) means for securing said front surfaces of each said modular component to a rear surface of an adjacent component module;

a power supply module including:
(a) a power supply
(b) a casing containing said power supply, said casing including a front surface having dimensions substantially equivalent to said first and second surfces of said component module; and
(c) a power supply connector having one or more printed circuit board surface connectors each with leaf spring electtrical contacts electrically connected to said power supply engaging predetermined electrical surface contacts of said second array of computer module contacts;

an input/output module including:
(a) a visual display
(b) a keyboard interface;
(c) a casing containing said visual display and said keyboard interface, including a front surface having dimensions substantially equivalent to said first and second surfaces of said component module; and
(d) a receptacle having an array of electrical surface contacts disposed therein, each in engagement with one of said electrical contacts of said first array of contacts of said computer module connectors, a number of said electrical contacts of said input/output moddle receptacle being electrically connected to said visual display and said keyboard; and means for mechanically interconnecting each said component module to an adjacent component module.

6. The mdoular computer system according to claim 5, wherein said securing means includes a partial dovetail groove extending along the edge of the upper surface of each said component module casing at a predetermined distance from said first surface threof and further including a slide for engaging said partial dovetail groove and for mechanically connecting each said component module to an adjacent component module.

7. The modular computer system according to claim 6, wherein said securing means further includes a tongue extending upwardly from the lower edge of said second surface of each said computer component and a groove extending along the bottom surface of said component module adjacent said first surface thereof.

8. The modular computer system according to claim 5, further comprising safety means for disrupting the supply of power from said power supply module to said electrical contacts of said power supply module connector in response to the diesengagement of one or more of said component modules.

9. The modular computer system according to claim 8, wherein each said component module includes an interlock switch for disrupting the transmission of a predetermined electrical signal through said bus assembly.

10. The modular computer system according to claim 6, wherein each said bus assembly of said component module includes an interlock switch for disrupting the transmission of a predetermined electrical signal between said component module receptacle and said component module connector in response to the disengagement of said slide from said partial dovetail groove.

11. The modular computer system according to claim 6, wherein each said bus assembly of said component module includes an interlock switch for disrupting the transmission of a predetermined electrical signal between said component module receptacle and said component module connector when open, and for securing said slide in full engagement with said partial dovetail groove when closed.

12. A modular computer system, including a plurality of peripheral components, each housed in a module comprising:
a rectangular casing, including front and rear surfaces having a predetermined height and width;
an integral bus assembly extending between the front and rear surfaces of said casing at a predetermined location for facilitating electrical interconnection of said peripheral components, said bus assembly including an array of surface-mount printed circuit board connectors extending outwardly of said front surface of said casing, one or more connectors incorporating a conductor having an end portion forming a leaf spring contact for abutting and establishing electrical connection with a surface contact of an adjacent module with minimal frictional resistance, a receptacle portion extending inwardly from said rear surface of said casing having an array of surface contacts for engaging leaf spring contacts of the connectors of an adjacent module, and further including a predetermined arrangement of individual bus lines extending between the contacts of sid connectors and said receptacle;
a peripheral component housed within said casing; and
a printed circuit board, housed within said casing and substantially parallel to said front and rear surfaces thereof, electrically connecting said peripheral component to a number of said individual bus lines of said bus assembly, wherein said module casing further includes a switch means for establishing electrical continuity of one or more of said individual bus lines.

13. The modular computer system according to claim 12, wherein said module casing further includes:
a first partial dovetail groove extending along the upper surface of said casing at a predetermined distance from said front surface of said casing;
a plurality of spaced apart tapered dovetail locking grooves, each extending along the upper surface of said casing at a predetermined distance from said rear surface of said casing;
a slide member mounted to said first partial dovetail groove along a first longitudinal edge of said slide member and slidable between locked and unlocked positions, said slide member having a number of partial dovetail sections, each extending along a second longitudinal edge of said slide member, said dovetail sections being sized and spaced apart suitably for insertion between locking grooves of an adjacent module casing when said slide is placed in the unlocked position and engagement with grooves of an adjacent module casing when said slide is placed in the locked position;
an interlock groove extending along the lower surface of said module casing at a predetermined distance from the front surface thereof;
a tongue member extending outwardly from the lower edge of said rear surface of said module casing;
a ridge extending upwardly from the distal end of said tongue member at a distance from said rear surface of said casing substantially equivalent to the predetermined distance separating said interlock groove from said front surface of said module casing, said ridge having external dimensions corresponding to the internal dimensions of said interlock groove, whereby said tongue and ridge of said module casing may mechanically engage an interlock groove of an adjacent module of said modular computer system, said tongue member and said interlock groove each including guide members for laterally aligning said casing with an adjacent casing during their mechanical interconnection.

14. The modular computer system according to claim 12, wherein said front surface of said module casing includes a plurality of apertures disposed at predetermined locations and said rear surface includes a plurality of guide pins extending outwardly therefrom at locations directly opposite said apertures, whereby said guide pins engage apertures of an adjacent module when said module is mechanically connected thereto.

15. The modular computer system according to claim 12, wherein said module casing further includes:
   a first partial dovetail groove extending along the lower surface of said casing at a predetermined distance from said front surface of said casing;
   a number of spaced apart tapered dovetail locking grooves, each extending along the lower surface of said casing at a predetermined distance from said rear surface of said casing; and
   a slide member mounted to said first partial dovetail groove along a first longitudinal edge of said slide member and slidable between locked and unlocked positions, said slide member having a number of partial dovetail sections, each extending along a second longitudinal edge of said slide member, said dovetail sections being sized and spaced apart suitably for insertion between locking grooves of an adjacent module casing when said slide is placed in the unlocked position and engagement with locking grooves of an adjacent module casing when said slide is placed in the locked position.

16. A modular computer system with integral bus, comprising:
   one or more component modules each including:
      (a) a computer component;
      (b) a casing containing said component, said casing including opposing first and second surfaces of equivalent dimension;
      (c) a bus assembly for electrical interconnection with an adjacent component module, said bus assembly including a connector extending outwardly from said first surface of said casing, having a first array of electrical contacts disposed thereon, and a receptacle extending into said casing from said second surface thereof, having a second array of electrical contacts disposed therein, said connector and receptacle being disposed in substantial alignment at opposing locations on said first and second surfaces of said casing, said first and second arrays of electrical contacts being arranged in aligned pairs at opposing locations on said connector and said receptacle, each of said aligned pairs of electrical contacts being electrically interconnected and wherein a number of said electrical contacts are electrically connected to said computer comonents; and
      (d) means for securing said front surfaces of each said modular component to a rear surface of an adjacent component module;
   a power supply module including:
      (a) a power supply
      (b) a casing containing said power supply, said casing including a front surface having dimensions substantially equivalent to said first and second surfaces of said component module; and
      (c) a power supply connector having one or more electrical contacts electrically connected to said power supply for engagement with predetermined electrical contacts of said second array of computer module contacts;
   an input/output module including:
      (a) a visual display
      (b) a keyboard interface;
      (c) a casing containing said visual display and said keyboard inteface, including a front surface having dimensions substantially equivalent to said first and second surfaces of aid component module; and
      (d) a receptacle having an array of electrical contacts disposed therein, each in engagement with said electrical contacts of said first array of contacts of said computer module connector, a number of said electrical contacts of said input/output module receptacle being electrically connected to said visual display and said keyboard;
   means for mechanically interconnecting each said component module to an adjacent component module;
   a pin member extending outwardly from said rear surface of said input/output module at a predetemined location;
   a pin member slidably mounted within an aperture extending between said first and second surfaces of each said component module, for abutting said first pin member as said computer component is mechanically connected to said input/output module, thereby causing said second pin member to extend from said second surface of said computer module;
   an aperture extending through said front surface of said power supply module for receiving said second pin member; and
   a switch disposed within said power supply module for enabling the supply of power from said power supply to said electrical contacts of said power supplycconnector in response to the insertion of said second pin member into said aperture of said power supply module.

* * * * *

UNITED STATES PATENT AND TRADEMARK OFFICE
CERTIFICATE OF CORRECTION

PATENT NO. : 4,680,674
DATED : July 14, 1987
INVENTOR(S) : Fergus E. Moore

It is certified that error appears in the above-identified patent and that said Letters Patent is hereby corrected as shown below:

```
Column 19, line 36, change "equilvalent ot" to --equivalent to--.
Column 20, line 28, change "ofan" to --of an--.
Column 20, line 44, change "assebly" to --assembly--.
Column 20, line 64, change "electical" to --electrical--.
Column 21, line 9, change "surfces" to --surfaces--.
Column 21, line 12, change "electtrical" to --electrical--.
Column 21, line 29, change "moddle" to --module--.
Column 21, line 34, change "mdoular" to --modular--.
Column 21, line 38, change "threof" to --thereof--.
Column 21, line 52, change "diesengagement" to --disengagement--.
Column 21, line 60, after "wherein" delete "each", after "of"
   insert --each--.
Column 21, line 67, after "wherein" delete "each", after "of"
   insert --each--.
Column 22, line 28, change "sid" to --said--.
Column 24, line 26, change "inteface" to --interface--.
Column 24, line 28, change "aid" to --said--.
Column 24, line 57, change "supplycconnector" to --supply
   connector--.
```

Signed and Sealed this

Seventeenth Day of May, 1988

*Attest:*

DONALD J. QUIGG

*Attesting Officer*    *Commissioner of Patents and Trademarks*